United States Patent
Ohtake

(10) Patent No.: US 6,196,815 B1
(45) Date of Patent: Mar. 6, 2001

(54) SCROLL-TYPE FLUID APPARATUS IN WHICH A DISCHARGE VALVE HAS A REDUCED RIGIDITY AND UNIFORM DISTRIBUTION OF BENDING STRESS

(75) Inventor: Shinichi Ohtake, Ashikaga (JP)

(73) Assignee: Sanden Corporation, Gunma (JP)

( * ) Notice: Subject to any disclaimer, the term of this patent is extended or adjusted under 35 U.S.C. 154(b) by 0 days.

(21) Appl. No.: 09/433,587

(22) Filed: Nov. 4, 1999

(30) Foreign Application Priority Data

Nov. 5, 1998 (JP) .................................................. 10-314824

(51) Int. Cl.[7] ........................................................ F01C 1/02
(52) U.S. Cl. ........................ 418/55.1; 418/270; 137/856
(58) Field of Search ................................. 418/55.1, 270; 137/856

(56) References Cited

U.S. PATENT DOCUMENTS

| 5,197,869 | * | 3/1993 | Hansen et al. | 418/270 |
| 5,203,686 | * | 4/1993 | Scheldorf et al. | 418/270 |
| 5,380,176 | * | 1/1995 | Kikuchi et al. | 137/856 |
| 5,597,296 | * | 1/1997 | Akazawa et al. | 418/55.1 |

FOREIGN PATENT DOCUMENTS

| 2163236 | * | 2/1986 | (GB) | 418/270 |
| 62-218684 | * | 9/1987 | (JP) | 418/270 |
| 5-272472 | * | 10/1993 | (JP) | 418/270 |
| 7-189938 | * | 7/1995 | (JP) | 418/55.1 |
| 7-189942 | * | 7/1995 | (JP) | 418/55.1 |
| 7-189943 | * | 7/1995 | (JP) | 418/55.1 |
| 11-141474 | * | 5/1999 | (JP) | 418/55.1 |

* cited by examiner

Primary Examiner—Thomas Denion
Assistant Examiner—Theresa Trieu
(74) Attorney, Agent, or Firm—Baker Botts L.L.P.

(57) ABSTRACT

In scroll-type fluid apparatus in which a flap valve is provided to face a discharge port for discharging a fluid, the flap valve has a bridging portion which is between a supporting portion and a closing portion and has a narrow part narrower than the supporting and the closing portions. The supporting portion is fixed to the apparatus. The closing portion faces the discharge port. A scroll-type transferring mechanism is coupled to the discharge port and transfers the fluid towards the discharge port to discharge the fluid through the discharge port.

12 Claims, 7 Drawing Sheets

LOW-SPEED ROTATION

HIGH-SPEED ROTATION

SCROLL-TYPE FLUID APPARATUS IN WHICH A DISCHARGE VALVE HAS A REDUCED RIGIDITY AND UNIFORM DISTRIBUTION OF BENDING STRESS

BACKGROUND OF THE INVENTION

This invention relates to a reciprocating-type fluid apparatus and, in particular, to a scroll-type fluid apparatus, such as a scroll compressor, for use in an air conditioner for a railroad car, an automobile, a house, and the like.

Referring to FIG. 1, an existing scroll compressor will be described. In the manner which will presently be described, the scroll compressor comprises a drive shaft or a crank shaft 1, a counterweight 2, an eccentric bush 3, a movable scroll member 4, and a fixed scroll member 5. The crank shaft 1 has an enlarged spindle portion 10 with a crank pin 110 eccentrically coupled thereto. The rotation of the crank shaft 1 on its own axis 99 (depicted by a dash-and-dot line in FIG. 1) causes the revolution of the crank pin 110 around the axis 99 of the crank shaft 1. The crank pin 110 is fitted into a crank pin receptacle 30 formed in the eccentric bush 3. The revolution of the crank pin 110 provides the revolution of the eccentric bush 3.

The movable scroll member 4 has a side plate 41, a spiral or involute lap 40 formed on one side of the side plate 41, and an annular boss 42 formed on the other side. The spiral or involute lap 40 will be called hereinafter a spiral element. The eccentric bush 3 is coupled to the boss 42 via a needle bearing 230 to be smoothly rotatable in the boss 42.

With the above-mentioned structure, the eccentric bush 3 and the movable scroll member 4 coupled thereto perform the revolution with respect to the crank shaft 1.

In order to suppress the rotation of the movable scroll member 4, a rotation inhibiting mechanism 210 is provided. The rotation inhibiting mechanism 210 comprises a pair of annular races 211 and a ball 212. By the rotation inhibiting mechanism 210, the movable scroll member 4 is allowed to perform the revolution alone.

Referring to FIG. 2 together with FIG. 1, the movable scroll member 4 has the spiral element 40 as described above. Likewise, the fixed scroll member 5 is provided a spiral element 50 having a shape similar to that of the spiral element 40. The movable scroll member 4 and the fixed scroll member 5 are arranged to be eccentric with each other by a predetermined distance with the spiral elements 40 and 50 shifted from each other by an angle of 180°. With this structure, a plurality of closed spaces G are defined between the spiral elements 40 and 50 as illustrated in FIG. 2. An inner one and an outer one of the closed spaces G are smaller and greater in volume, respectively.

Therefore, a fluid sucked into the closed spaces G through a suction port (not shown) is transferred radially inward to be gradually compressed into a compressed fluid. Finally, the compressed fluid is led to a discharge port 6. The discharge port 6 is connected to a discharge chamber 8 through a discharge valve 7. The discharge chamber 8 is kept at a high pressure and the discharge valve 7 is normally closed under the high pressure in the discharge chamber 8. When the compressed fluid reaches the discharge port 6, the discharge valve 7 is opened under an increased pressure in the discharge port 6 so that the compressed fluid is discharged into the discharge chamber 8.

Thus, a series of operations mentioned above are carried out when the fluid is compressed by the scroll compressor. The components mentioned above are sealed in a casing 9 and a front housing 100 to be protected. A combination of the movable and the fixed scroll members 4 and 5 is referred to as a scroll-type transferring mechanism.

As illustrated in FIG. 1, the discharge valve 7 is attached to a base end wall 501 of the fixed scroll member 5 together with a retainer 80 by the use of a bolt 801 screwed into the base end wall 501 through the fixing hole 70.

Referring to FIGS. 3A through 3D, the structure of the discharge valve 7 will be described.

In FIG. 3A, the discharge valve 7 has a fixed portion 7a supported on the fixed scroll 5 and having a fixing hole 70, a closing portion 7b closing the discharge port 6, and a bridging portion 7c connecting the fixed portion 7a and the closing portion 7b. An outer contour of the discharge valve 7 is defined by a first arc 700a of the fixed portion 7a, a second arc 700b of the closing portion 7b, and a pair of straight lines 700c of the bridging portion 7c. The discharge valve 7 is a flap valve comprising an elastic plate. More particularly, the discharge valve 7 has a cantilevered structure having the fixed portion 7a fixedly supported on the fixed scroll member 5 and the closing portion 7b brought into contact with a peripheral edge of the discharge port 6 to close the discharge port 6.

The first arc 700a of the fixed portion 74 extends along a circle of a first diameter while the second arc 700b of the closing portion 7b extends along a circle of a second diameter. In the discharge valve 7 of FIG. 3A, the second diameter is determined greater than the first diameter. It will be understood that a diameter of the discharge port 6 is smaller than the second diameter. With this structure, the bridging portion 7c is widened from the fixed portion 7a towards the closing portion 7b. Contrary to the above-mentioned uniform strength beam, the bending stress is increased from the closing portion 7b towards the fixed portion 7a so that the discharge valve 7 is difficult to deflect. In addition, the stress is smaller towards the closing portion 7b, resulting in inefficiency.

The fixed portion 7a connected to a narrowest part of the bridging portion 7c may be subjected to stress concentration when the load is applied from the compressed fluid in the discharge port 6. Therefore, the life of the discharge valve 7 is inevitably shortened.

In FIG. 3B, the second diameter is determined smaller than the first diameter. With this structure, the bridging portion 7c connecting the fixed portion 7a and the closing portion 7b is gradually narrowed towards the closing portion 7b. However, the first arc 700a of the fixed portion 7a and the second arc 700b of the closing portion 7b are simply connected by the straight lines 700c of the bridging portion 7c. The diameter of the discharge port 6 must be smaller than the second diameter that is smaller than the first diameter.

In FIG. 3C, the second diameter is determined equal to the first diameter. In this case also, the valve-opening force is greater than that of the uniform strength beam mentioned above.

In FIG. 3D, the second diameter is determined greater than the first diameter, like in FIG. 3A. The first arc 700a of the fixed portion 7a and the second arc 700b of the closing portion 7b are connected by the parallel straight lines 700c of the bridging portion 7c. Even in this case, the valve-opening force is greater than that of the uniform strength beam mentioned above, like the structure illustrated in FIG. 3C. In addition, stress concentration may possibly occur at a portion depicted by a broken line in FIG. 3D between the first arc 700a and the straight lines 700c.

In each of the discharge valves of FIGS. 3A through 3D, the first arc 700a of the fixed portion 7a and the second arc $700b$ of the closing portion $7b$ are simply connected to each other by the straight lines $700c$ of the bridging portion $7c$.

Referring to FIGS. 4A and 4B, description will be made about the technical background to discuss the rigidity problem.

At first, consideration will be made about a cantilevered beam comprising a rectangular plate illustrated in FIG. 4A. The rectangular plate will hereinafter be called a parallel beam.

The parallel beam has a rectangular section. The parallel beam has one end as a fixed end supported on a wall and the other end as a free end. The free end is subjected to a concentrated load.

The deflection y and the deflection angle i of the parallel beam are calculated as follows:

$$\text{Deflection Curve:} d^2y/dx^2 = -M/EI = Px/EI \quad (1)$$
$$dy/dx = P/EI(x^2 + C_1)$$
$$\text{when } x = 1, y = 0$$
$$\text{when } x = 1, dy/dx = 0$$

$$\therefore i = dy/dx = P/2EI \cdot (x^2 - l^2),$$
$$y = P/6EI \cdot (x^3 - 3l^2x + 2l^3)$$
$$\text{from } I = bh^3/12,$$
$$y = 2P/bEh^3 \cdot (x^3 - 3l^2x + 2l^3)$$
$$i_{max} = i_{x=0} = -Pl^2/2EI = -6Pl^2/Eh^3,$$
$$y_{max} = y_{x=0} = Pl^3/3EI = 4P/bE \cdot (l/h)^3,$$

where P represents a load, M, a bending moment, E, the Young's Modulus, and I, a moment of inertia of area.

In FIG. 4B, a cantilevered beam of a uniform strength beam has a rectangular section of a constant height h. The cantilevered beam will be called hereinafter a triangular beam. The triangular beam has one end as a fixed end supported on a wall and the other end as a free end subjected to a concentrated load.

The deflection y and the deflection angle i of the triangular beam are calculated as follows:

$$\text{Bending Stress:} \quad \sigma = My/I = M/Z = \text{constant},$$
$$\text{Deflection Curve:} \quad d^2y/dx^2 = -M/EI = -\sigma/Ey = 1/y \times (\text{constant})$$
$$M = -Px, \quad Z = bh^2/6$$
$$\sigma = M/Z = 6Px/bh^2 = \text{constant},$$

where Z represents a section modulus.

As mentioned above, the height h of the section is constant.

$$h = h_0 = \text{constant} \quad (2)$$

Then, $$b = b_0/l \cdot x \quad b_0 = 6Pl/\sigma h_0^2$$

-continued
$$d^2y/dx^2 = -M/EI - Pl/EI_0 = \text{constant}$$
$$\therefore i = dy/dx = Pl/EI_0 \cdot (x - l),$$
$$y = Pl/2EI \cdot (l - x)^2$$
from $I_{0X} = l$,
$$y = Pl/2EI \cdot (1 - x)^2 = 6Pl/bEh^3 \cdot (1 - x)^2$$
$$i_{max} = i_{x=0} = -Pl^2/EI_0 = -12Pl^2/bEh^3,$$
$$y_{max} = y_{x=0} = Pl^3/2EI_0 = 6P/b_0E \cdot (l/h)^3.$$

Comparison will be made between the deflections given by Equations (1) and (2) for the parallel beam and the triangular beam.

$$y_{max} = y_{x=0} = Pl^3/3EI = 4P/bE \cdot (l/h)^3 \quad (1)$$

$$y_{max} = y_{x=0} = Pl^3/2EI_0 = 6P/b_0E \cdot (l/h)^3 \quad (2)$$

The ratio is calculated as follows:

$$\frac{y_p}{y_t} = \frac{Pl^3/3EI}{Pl^3/2EI_0} = \frac{2EI_0}{3I} = \frac{4P/bE \cdot (l/h)^3}{6P/b_0E \cdot (l/h)^3} = \frac{3b_0}{2b}$$

$$y_t = (3b/2b_0)y_p$$

If $b=b_0$, then $y_t=1.5y_p$. Thus, the deflection of the triangular beam is 1.5 times greater than that of the parallel beam. That is, the triangular beam is easily deflected.

Consideration will be made about the condition to obtain the relationship $y_t > Y_p$.

$$y_t - y_p = (3b/2b_0)y_p - y_p = 3b - 2b_0 > 0$$
$$\therefore 1.5 > b_0$$

If b=10, $b_0 < 15$ mm.

Thus, if the value of $b_0$ is selected within a range given by $1.5b > b_0$, the deflection of the triangular beam is greater than that of the parallel beam.

As will be understood from the foregoing, the deflection of the parallel beam is smaller than that of the triangular beam, provided that the both beams have the constant height h, are subjected to the same load, and are equal in length to each other. Thus, the parallel beam is difficult to be deflected under the load and uses an unnecessarily large material as compared with the triangular beam. Specifically, according to the theory of the uniform strength beam, it is possible to provide a valve structure with the stress and the deflection in appropriate levels and to prolong the life of the valve. In the existing scroll compressor, the discharge valve has such a configuration that the first and the second arcs of the fixed portion and the closing portion are simply connected by the straight lines of the bridging portion.

Specifically, no consideration is made about the rigidity of the discharge valve in relation to the pressure of the fluid discharged through the discharge valve. The fixed portion and the closing portion are simply connected by the bridging portion configured to meet the shapes of he fixed portion and the closing portion. The deflection of the valve and the stress are not sufficiently considered. Therefore, the discharge valve has a high rigidity so that the valve-opening force is inevitably increased. This results in an increase in power consumption and a reduction in life of the valve.

From the above-mentioned formulas about the theory of the uniform strength beam, it is understood that the deflection of the parallel beam defined by parallel straight lines is smaller than that of the triangular beam defined by inclined straight lines and having the constant height h, provided that the both beams are subjected to the same load and are equal in length to each other. Therefore, the parallel beam is difficult to be deflected under the load and uses an unnecessarily large material as compared with the triangular beam. Specifically, according to the theory of the uniform strength beam, it is possible to provide a valve structure with the stress and the deflection in appropriate levels and to prolong the life of the valve.

With reference to FIGS. 5A and 5B, the operation of the discharge valve 7 will be described. At first referring to FIG. 5A, the scroll compressor performs low-speed rotation. In each cycle of the low-speed rotation, the discharge valve 7 is closed before discharge, opened during discharge, and closed after discharge as illustrated in the figure. Thus, the discharge valve 7 is repeatedly closed and opened.

Referring to FIG. 5B, the scroll compressor performs high-speed rotation. In this case, before the discharge valve 7 is closed at the end of a first cycle, discharge in a next cycle is started as illustrated in the figure. Therefore, the discharge valve 7 is not closed once the first cycle is started and repeatedly moved within a range depicted by dotted lines in FIG. 5B.

The discharge valve 7 is essential in order to avoid the backflow of the fluid although it is preferred in view of the efficiency of the compressor that the discharge valve 7 is not provided. The operation of the discharge valve 7 during the high speed rotation illustrated in FIG. 6B is preferable because the valve-opening force is reduced and the power consumption of the compressor is saved. Thus, the efficiency of the compressor is improved.

However, the existing discharge valve mentioned above is configured without considering mechanical properties and is difficult to be deflected because of a high rigidity. Therefore, the discharge valve is difficult to open. Thus, the compressor having the existing discharge valve is disadvantageous because the power consumption of the compressor is inevitably large.

SUMMARY OF THE INVENTION

It is an object of this invention to provide a scroll-type fluid apparatus which is capable of reducing valve-opening force for opening a discharge valve by reducing the rigidity to save power consumption of the fluid apparatus without causing drastic decrease in stress.

It is another object of this invention to provide a scroll-type fluid apparatus which is capable of reducing valve-opening force for opening a discharge valve and achieving an appropriate bending stress of the valve so as to prolong the life of the valve.

It is still another object of this invention to provide a scroll-type fluid apparatus which is capable of reducing valve-opening force for opening a discharge valve at a relatively low rotation speed so as to save power consumption of the fluid apparatus.

According to this invention, there is provided a scroll-type fluid apparatus which comprises a discharge port for discharging a fluid, a scroll-type transferring mechanism coupled to the discharge port for transferring the fluid towards the discharge port to discharge the fluid through the discharge port, and a flap valve comprising a supporting portion fixed to the apparatus, a closing portion facing the discharge port, and a bridging portion between the supporting portion and the closing portion, the bridging portion having a narrow part narrower than the supporting and the closing portions.

DESCRIPTION OF THE EMBODIMENT

Figure 1:
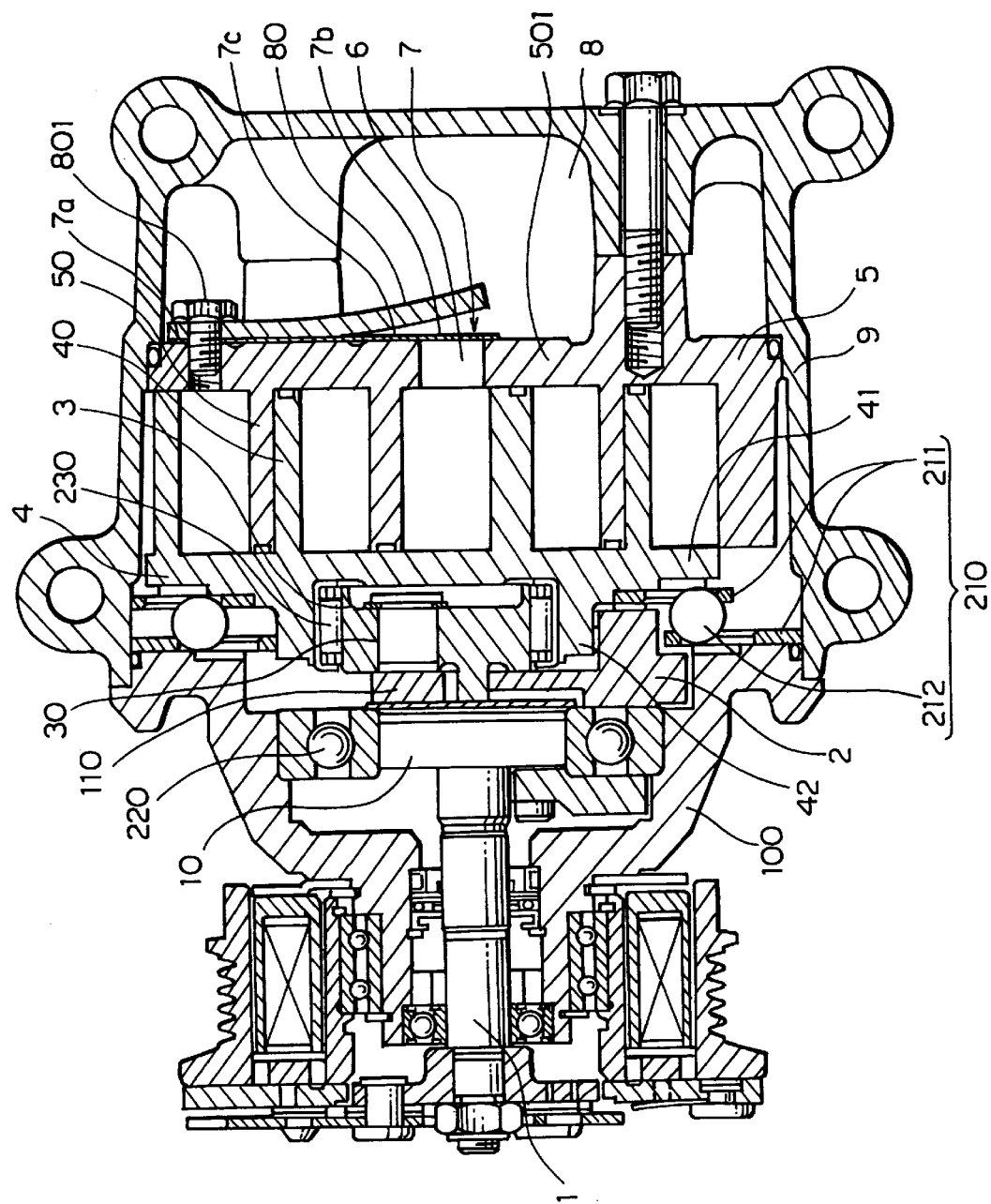
FIG. 1 is a sectional view of a typical scroll compressor.
Figure 2:
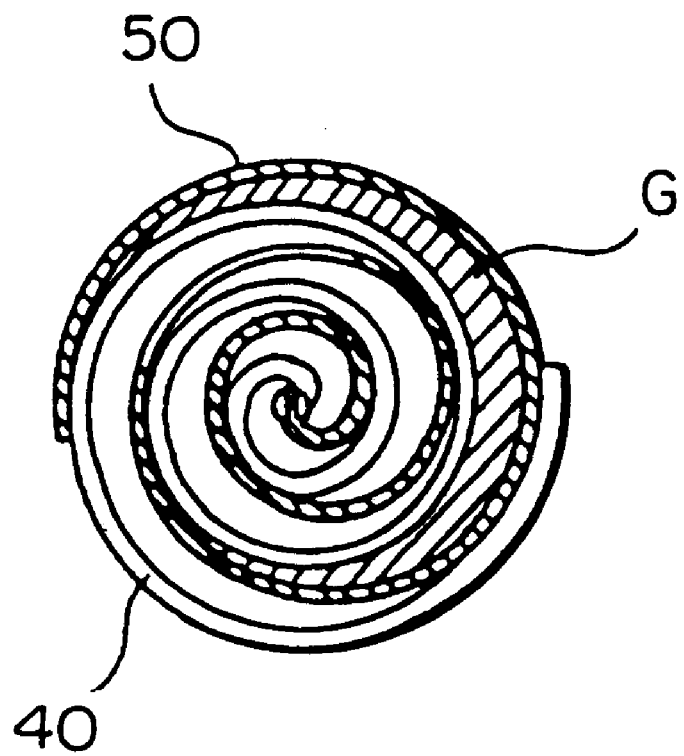
FIG. 2 is a vertical sectional view showing spiral elements of a movable scroll member and a fixed scroll member illustrated in FIG. 1.
Figure 3A:
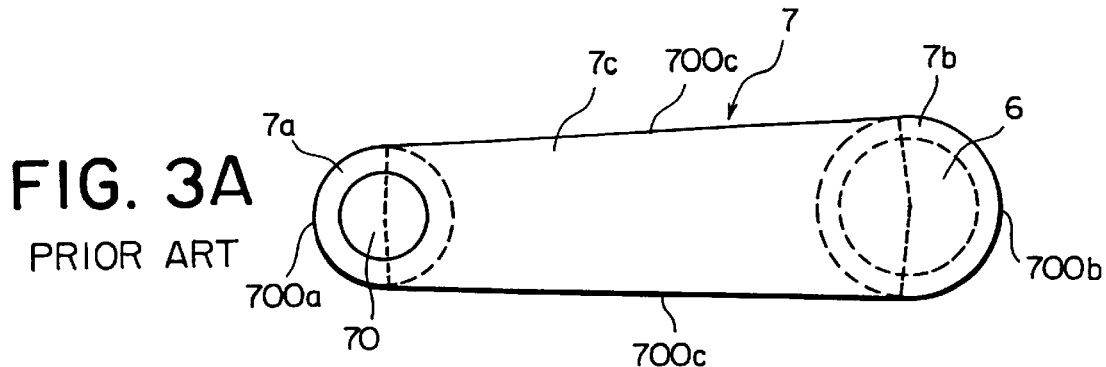
FIGS. 3A through 3D show various configurations of a discharge valve of the typical scroll compressor.
Figure 3B:
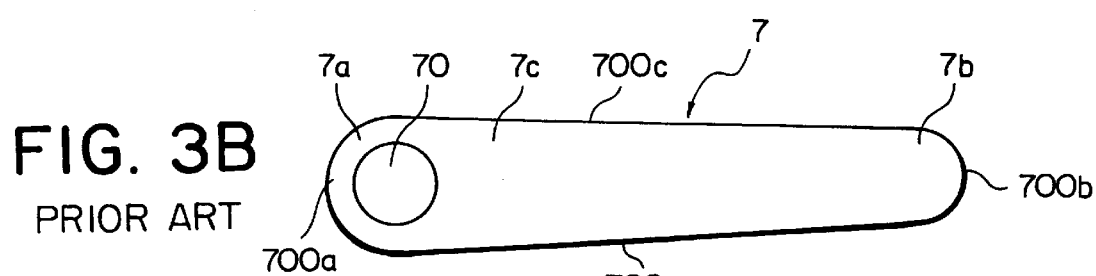
Figure 3C:
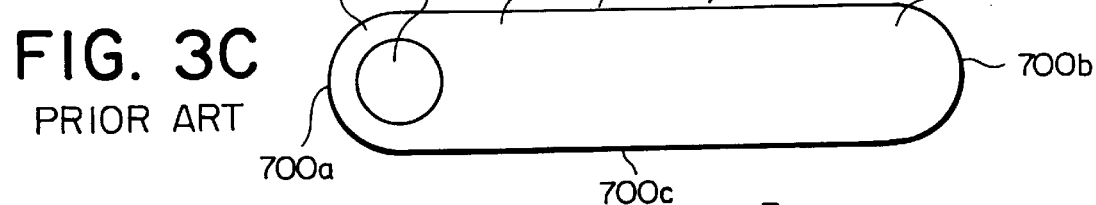
Figure 3D:
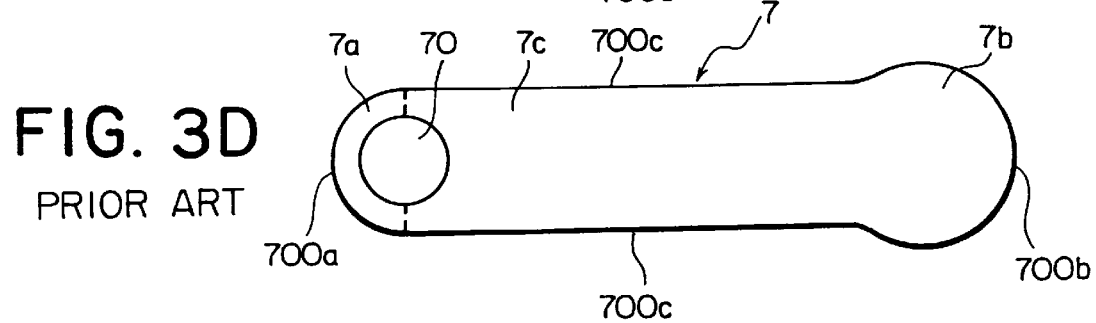
Figure 4A:
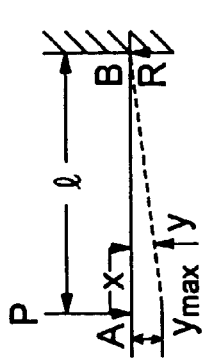
FIGS. 4A and 4B are views for describing the deflection of beams.
Figure 4B:
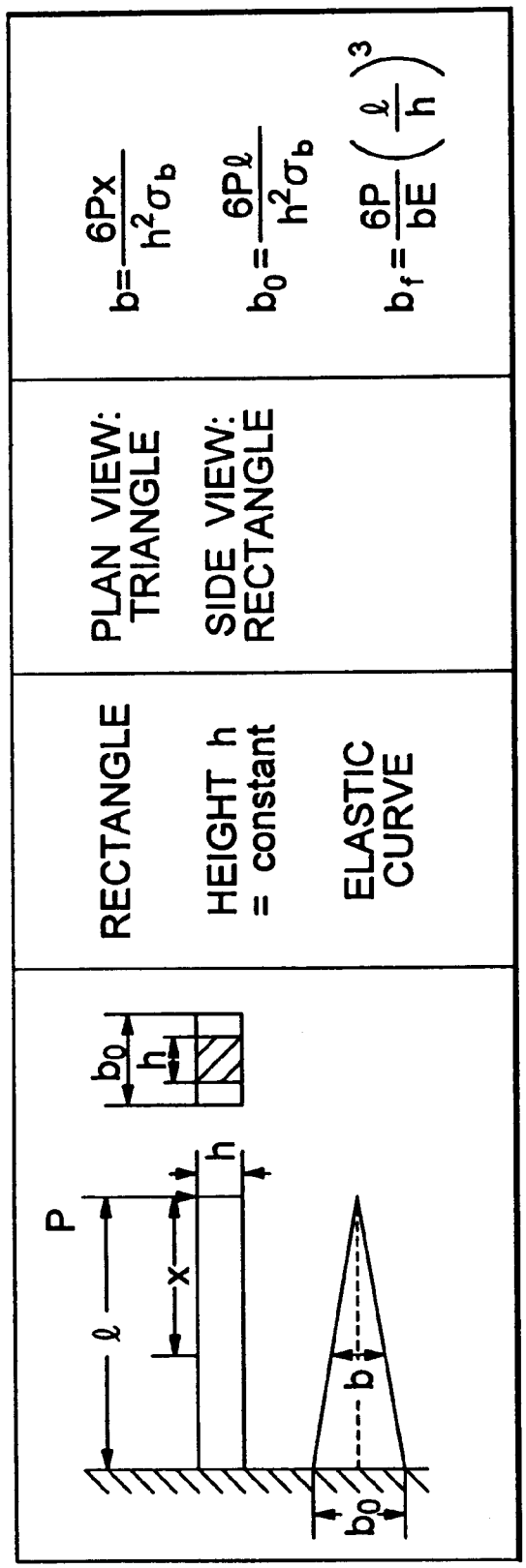

Description will now be made about one embodiment of this invention with reference to the drawing.

A scroll compressor according to one embodiment of this invention is basically similar in structure to that of the typical scroll compressor illustrated in FIG. 1. Therefore, the following description is mainly directed to a discharge valve 7 illustrated in FIGS. 6A through 6D.

As described in conjunction with FIG. 1, the discharge valve 7 is attached to an base end wall 501 of a fixed scroll member 5 together with a retainer 80 by the use of a bolt 801 screwed into the base end wall 501 through a fixing hole 70 of the discharge valve 7.

Figure 6A:
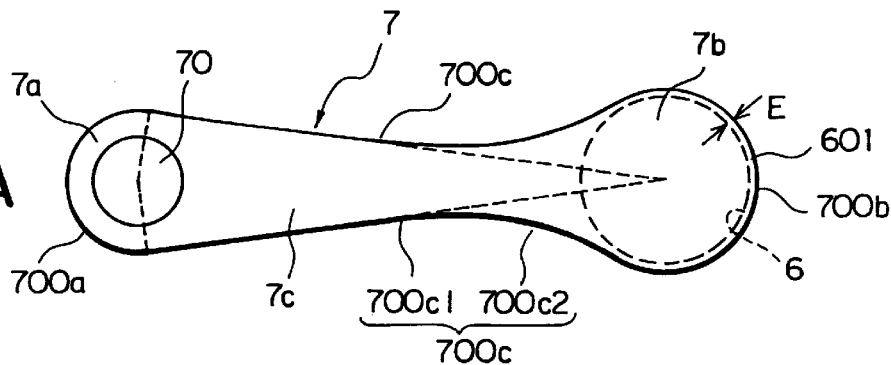
FIGS. 6A through 6D show various configurations of a discharge valve of a scroll compressor according to an embodiment of this invention.

At first referring to FIG. 6A, the discharge valve 7 has a fixed portion 7a having the fixing hole 70 and fixed to the end wall 501 as described above, a closing portion 7b brought into contact with a peripheral edge of a discharge port 6 to close the discharge port 6, and a bridging portion 7c connecting the fixed portion 7a and the closing portion 7b.

The discharge valve 7 has an outer contour which is a combination of a first arc 700a of the fixed portion 7a, a second arc 700b of the closing portion 7b, and a pair of connecting lines 700c each of which has a straight part 700c1 and a curved part 700c2. The curved part 700c2 serves to suppress stress concentration applied to a junction between the straight part 700c1 and the second arc 700b. The curved part 700c2 may have a wide variety of shapes.

Alternatively, the connecting line 700c may be a curved line smoothly connecting the first and the second arcs 700a and 700b without providing the straight part 700c1, as will later be described in conjunction with FIGS. 6B through 6D. Preferably, each of the connecting lines 700c is a gentle curve without including a drastic variation.

In order to reduce power consumption, a distance E between the second arc 700b and the discharge port 6 is minimized as far as the backflow of the refrigerant can be avoided when the compressor is stopped. In this event, the contact area between the discharge valve 7 and a valve sheet surface 601 around the discharge port 6 is reduced so that the contact resistance therebetween is reduced. Therefore, the valve-opening force is decreased. Generally, if an oil is adhered to the valve sheet surface 601, the adhering force of the oil makes it difficult to open the discharge valve 7. With the above-mentioned structure of this invention, the adhesion of the oil gives no substantial influence. Therefore, the valve 7 is easily opened, i.e., the valve-opening force is considerably reduced.

The valve in FIG. 6A also adopts the theory of the uniform strength beam. Thus, the width of the valve 7 is gradually reduced to decrease the opening load as far as the height h is constant.

To reduce the load, each of the connecting lines 700c comprises the straight part 700c1 and the curved part 700c2 smoothly connecting the straight part 700c1 and the closing portion 7b to achieve uniform distribution of the bending stress from the fixed portion 7a to the closing portion 7b.

In FIG. 6A, an apex of a virtual triangular beam formed by the straight lines 700c1, i.e., an intersection between the straight lines 700c1 is coincident with the center of the discharge port 6 assuming that the discharge pressure is applied to the center of the discharge port 6. Alternatively, depending upon the shape and the strength of the closing portion 7b, the intersection may be located at a position slightly apart from the center of the discharge port 6.

Figure 6B:
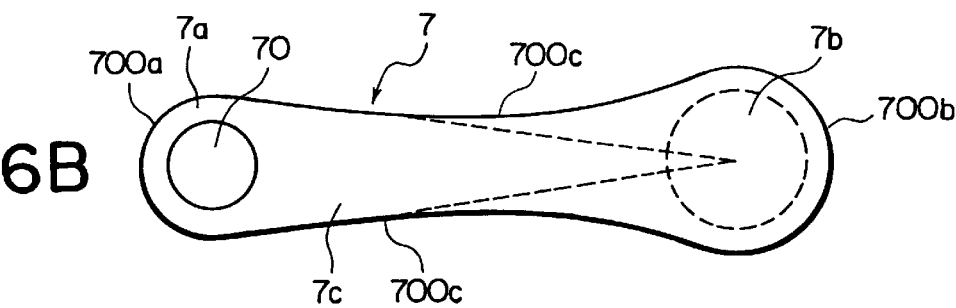

Referring to FIG. 6B, the second diameter is determined greater than the first diameter. Each of the connecting lines 700c connecting the first and the second arcs 700a and 700b is a gentle curve gradually decreasing from a gently inclined straight line. From the theory of the beam described above, it is understood that the discharge valve 7 illustrated in the figure is easily deflected when the load is applied from the refrigerant in the discharge port 6. Thus, the valve-opening force can be reduced. In addition, the curve is gradually decreasing so that the stress concentration is suppressed and the discharge valve 7 is prevented from being applied with heavy stress.

As each of the connecting lines 700c approaches a dotted-line portion near to the uniform strength beam, the discharge valve 7 is more easily deflected and the stress distribution is uniform. Thus, an efficient and economical valve structure is obtained.

Figure 6C:
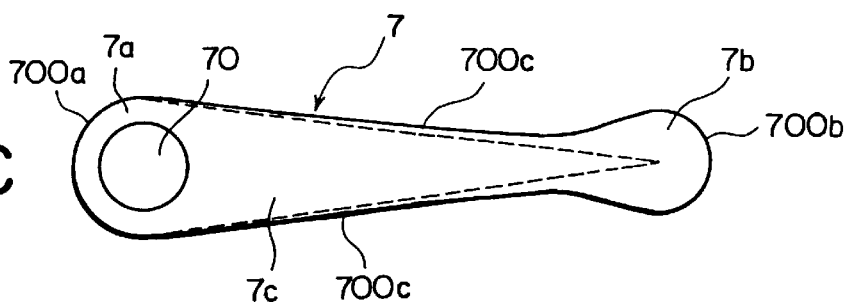
Figure 6D:
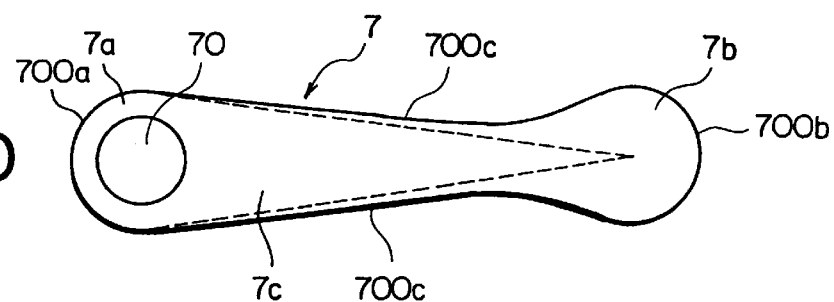

In each of FIGS. 6C and 6D, the discharge valve 7 has a section exhibiting a greater moment of inertia of area at a position nearer to the fixed portion 7a. In such valve, the valve-opening force is reduced with respect to the load. As regards each of the connecting lines 700c, the curve gradually decreasing serves to reduce the valve-opening force as compared with the straight line.

Like in FIG. 6B, the dotted-line portion represents an inclination angle of the uniform strength beam. Therefore, the connecting lines 700c can be formed along the inclination angle, depending upon the manner of use.

In each of the discharge valves 7 of FIGS. 6B through 6D also, the connecting lines 700c may be formed to approach the dotted-line portion as near as possible so as to more exactly comply with the theory of the uniform strength beam. In this event, the valve-opening force can be reduced. The uniform strength beam can suppress the excessive strength so as to reduce the amount of the material and the weight of the valve with the appropriate strength maintained.

In the examples being illustrated, the relationship between the first diameter and the second diameter is discussed. Alternatively, the first and the second diameters can be efficiently designed with respect to the diameter of the discharge port 6. For example, when the diameter of the discharge port 6 is great, the example in FIG. 6A is applied and the gradient of the straight part 700c1 is determined so as to reduce the rigidity. The gradient of the straight part 700c1 can be adjusted by increasing or decreasing the first diameter.

In each of the discharge valves 7 of FIGS. 6A through 6D, it will be understood that the bridging portion 7c has a narrow part narrower than the supporting and the closing portions 7a and 7b. In other words, the bridging portion has a width which gradually decreases from each of the supporting and the closing portions 7a and 7b.

Figure 5A:
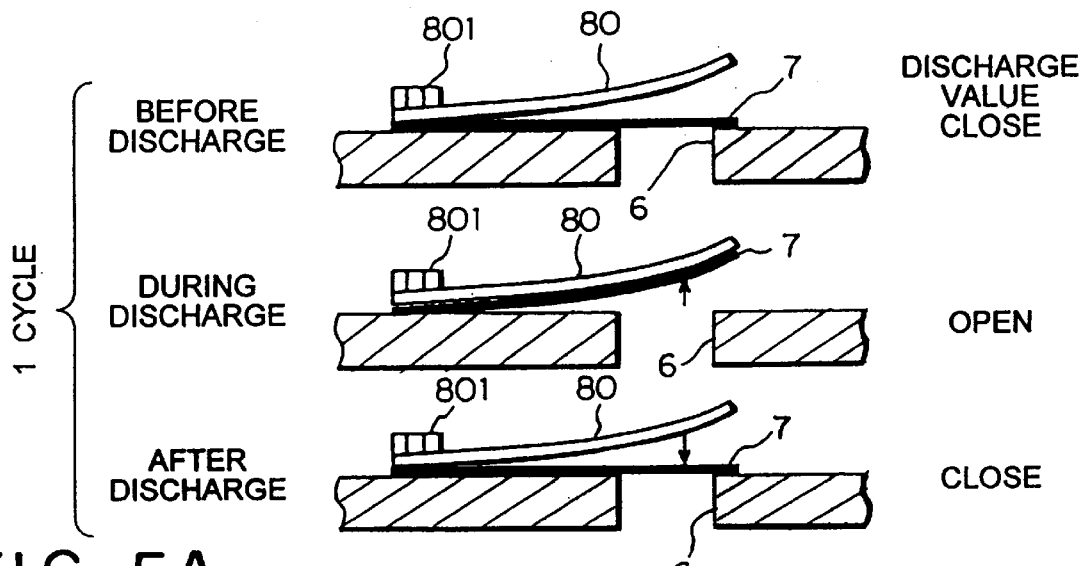
FIGS. 5A and 5B are views for describing the operation of the typical scroll compressor during low-speed rotation and high-speed rotation, respectively.
Figure 5B:
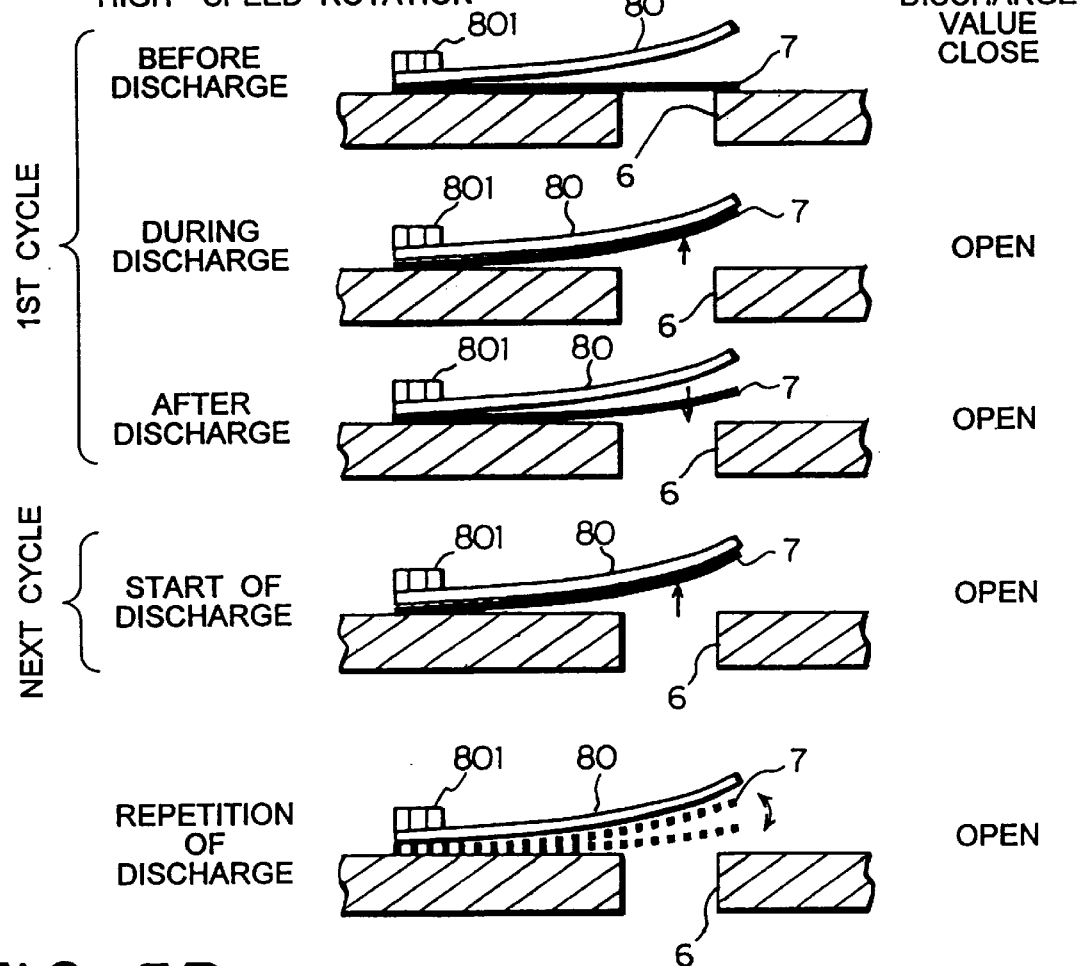

Referring to FIGS. 5A and 5B, the operation of the discharge valve 7 will be described.

The discharge valve 7 is attached to the base end wall 501 of the fixed scroll member 5 together with the retainer 80 by the use of the bolt 801. When the compressor performs the low-speed rotation, the discharge valve 7 is repeatedly opened and closed as illustrated in FIG. 5A. When the rotation speed is increased, the valve is operated in the manner illustrated in FIG. 5B. In the high-speed rotation, before the valve is closed at the end of a first cycle, discharge in a next cycle is started as illustrated in the figure. Thus, in the high-speed rotation, the valve is moved within a range depicted by the dotted lines in the figure.

In this invention, the rigidity of the valve is reduced so that the operation state illustrated in FIG. 5A is switched into the operation state illustrated in FIG. 5B at a lower rotation speed as compared with the existing valve. Therefore, the valve-opening force to open the discharge valve 7 is reduced.

Comparison between the existing valve and this invention is given in Table 1. The existing valve is repeatedly closed as illustrated in FIG. 5A when the rotation speed of the scroll compressor is 2000 rpm or less. In this invention, the valve is put into the operation state illustrated in FIG. 5B when the rotation speed reaches 2000 rpm.

TABLE 1

| Rotation Speed of Scroll Compressor (rpm) | 1000 | 2000 | 3000 | 4000 |
| --- | --- | --- | --- | --- |
| Existing Valve Structure | X | X | ○ | ○ |
| Valve of this Invention | X | ○ | ○ | ○ |

X: Valve is opened and closed in each cycle (Fig. 5A)
○: Valve is continuously opened (Fig. 6B)

From Table 1, it is understood that the discharge valve 7 is easily opened in this invention with respect to the variation of the rotation speed of the compressor. Therefore, the valve-opening force is reduced to save the power consumption of the compressor.

The discharge valve 7 is essential in order to avoid the backflow of the fluid although it is preferred in view of the efficiency of the compressor that the discharge valve 7 is not provided. Taking the above into account, this invention modifies the structure of the valve.

With the above-mentioned structure, the valve-opening force can be reduced. Furthermore, according to the theory of the uniform strength beam, distribution of the bending stress is generally uniform and uneconomical use of the material is prevented. Thus, a proper and efficient shape is achieved. The valve-opening force is reduced by reducing the rigidity of the valve without causing drastic decrease in stress. As a result, power consumption of the scroll-type fluid apparatus such as the scroll compressor can be saved. Furthermore, it is possible to achieve the valve structure in which material fatigue resulting from the repetition of application of the load is uniformly distributed without the stress concentration at a specific part. Thus, the life of the valve is prolonged. Specifically, the straight part extending from the fixed portion of the valve is formed so that the bending stress is uniform or substantially uniform. Therefore, the rigidity is minimized and the distribution of the stress is substantially uniform. Thus, the unnecessary material can be saved. The difference in diameter between the closing portion of the valve and the discharge port is minimized to reduce the contact resistance. This contributes to reduction of the valve-opening force.

While the present invention has thus far been described in connection with a few embodiments thereof, it will readily be possible for those skilled in the art to put this invention into practice in various other manners. For example, although the description has been made in conjunction with the compressor, it will readily be understood for those skilled in the art that this invention is also applicable to various fluid apparatuses using a fluid. Although the valve has a structure along the theory of the uniform strength beam, the inclination angle may not be exactly equal to $b_0/21$ if it is approximate thereto.

What is claimed is:

1. A scroll-type fluid apparatus comprising:
    a discharge port for discharging a fluid;
    a scroll-type transferring mechanism coupled to said discharge port for transferring said fluid towards said discharge port to discharge said fluid through said discharge port; and
    a flap valve comprising a supporting portion fixed to said apparatus, a closing portion facing said discharge port, and a bridging portion between said supporting portion and said closing portion, said bridging portion having a narrow part narrower than said supporting and said closing portions.

2. A scroll-type fluid apparatus as claimed in claim 1, wherein said bridging portion has a width which gradually decreases from each of said supporting and said closing portions to form said narrow part.

3. A scroll-type fluid apparatus as claimed in claim 1, wherein said bridging portion is defined by a pair of contour lines connecting outer contours of said supporting and said closing portions, said contour lines being curved to approach to each other.

4. A scroll-type fluid apparatus as claimed in claim 3, wherein each of said contour lines comprises a curved line alone.

5. A scroll-type fluid apparatus as claimed in claim 4, wherein said curved line is smoothly curved.

6. A scroll-type fluid apparatus as claimed in claim 3, wherein each of said contour lines comprises a combination of a curved line and a straight line smoothly connected to said curved line.

7. A scroll-type fluid apparatus as claimed in claim 6, wherein said curved line is smoothly curved.

8. A scroll-type fluid apparatus as claimed in claim 6, wherein said curved line is smoothly connected to said outer contours of said closing portion, said straight line smoothly connected to said supporting portion.

9. A scroll-type fluid apparatus as claimed in claim 3, wherein each of said contour lines is determined so that bending stresses at said closing and said supporting portions are equal to each other.

10. A scroll-type fluid apparatus as claimed in claim 3, wherein each of said contour lines is determined so that bending stresses at said closing and said supporting portions are approximately equal to each other.

11. A scroll-type fluid apparatus as claimed in claim 1, wherein said closing portion has a size which is similar to that of said discharge port.

12. A scroll-type fluid apparatus as claimed in claim 1, wherein said scroll-type transferring mechanism comprises:
    a fixed scroll member; and
    a movable scroll member coupled to said fixed scroll member for defining a space between said fixed and said movable scroll members, said movable scroll member being driven so that said fluid is transferred radially inward through said space to be compressed into a compressed fluid which is discharged through said discharge port.

* * * * *